(12) United States Patent
Franz et al.

(10) Patent No.: US 10,707,004 B2
(45) Date of Patent: Jul. 7, 2020

(54) LINEAR ACTUATOR

(71) Applicant: RAPA Automotive GmbH & Co. KG, Selb (DE)

(72) Inventors: Markus Franz, Hof (DE); Werner Döhla, Gefrees (DE); Martin Virow, Oberkotzau (DE)

(73) Assignee: RAPA Automotive GmbH & Co. KG, Selb (DE)

( * ) Notice: Subject to any disclaimer, the term of this patent is extended or adjusted under 35 U.S.C. 154(b) by 185 days.

(21) Appl. No.: 15/896,486

(22) Filed: Feb. 14, 2018

(65) Prior Publication Data

US 2018/0233260 A1    Aug. 16, 2018

(30) Foreign Application Priority Data

Feb. 15, 2017    (DE) .................. 10 2017 103 027

(51) Int. Cl.
| | |
|---|---|
| *H02K 41/02* | (2006.01) |
| *H01F 7/16* | (2006.01) |
| *B60K 5/12* | (2006.01) |
| *H02K 41/03* | (2006.01) |
| *H01F 7/08* | (2006.01) |
| *H02K 33/16* | (2006.01) |
| *H02K 1/34* | (2006.01) |

(52) U.S. Cl.
CPC ............. *H01F 7/1615* (2013.01); *B60K 5/12* (2013.01); *B60K 5/1283* (2013.01); *H01F 7/081* (2013.01);

(Continued)

(58) Field of Classification Search
CPC .... H01F 7/1615; H02K 33/16; H02K 41/031; H02K 41/03; H02K 41/02; H02K 1/34;

(Continued)

(56) References Cited

U.S. PATENT DOCUMENTS

| | | | |
|---|---|---|---|
| 5,486,730 A * | 1/1996 | Ludwig ................. | H02K 1/278 156/293 |
| 6,404,096 B1 * | 6/2002 | Kometani .............. | H02K 1/243 310/12.13 |

(Continued)

FOREIGN PATENT DOCUMENTS

| | | |
|---|---|---|
| DE | 11 2011 105 558 T5 | 5/2014 |
| DE | 10 2013 202 166 A1 | 8/2014 |

(Continued)

OTHER PUBLICATIONS

Extended European Search Report dated Jul. 4, 2018, in connection with corresponding EP Application No. 18155851.1 (11 pgs.).

*Primary Examiner* — Thanh Lam
(74) *Attorney, Agent, or Firm* — Maier & Maier, PLLC

(57) ABSTRACT

A linear actuator for an active motor mount of a motor vehicle includes a stator which has an electrically energizable coil for generating an electromagnetic field, as well as a magnetic armature which is mounted axially movable with regard to a longitudinal axis of the coil and has at least one permanent magnet ring which opposes the stator and has several permanent magnet ring segments. Between a surface of the permanent magnet ring segments which faces the stator and a surface of the stator which faces the permanent magnet ring segments there exists an angular gap with a gap angle ($\alpha$) of preferably 4°.

14 Claims, 1 Drawing Sheet

(52) U.S. Cl.
CPC ............ *H02K 33/16* (2013.01); *H02K 41/031* (2013.01); *H01F 2007/086* (2013.01); *H02K 1/34* (2013.01); *H02K 2201/03* (2013.01); *H02K 2213/03* (2013.01)

(58) Field of Classification Search
CPC ............ H02K 2201/03; H02K 2213/03; B60K 5/1283
USPC .................................................. 310/216.092
See application file for complete search history.

(56) References Cited

U.S. PATENT DOCUMENTS

| | | | | |
|---|---|---|---|---|
| 6,455,975 | B1 * | 9/2002 | Raad | H02K 7/125 |
| | | | | 310/152 |
| 6,700,280 | B1 * | 3/2004 | Geiger | B60K 6/26 |
| | | | | 310/193 |
| 7,728,463 | B2 * | 6/2010 | Cope | H02K 41/03 |
| | | | | 310/12.14 |
| 2008/0001483 | A1 | 1/2008 | Kitamura et al. | |
| 2011/0001591 | A1 * | 1/2011 | Puth | H01F 7/1615 |
| | | | | 335/229 |
| 2013/0181548 | A1 * | 7/2013 | Kakiuchi | H02K 9/19 |
| | | | | 310/12.29 |
| 2014/0292132 | A1 | 10/2014 | Kazmin et al. | |

FOREIGN PATENT DOCUMENTS

| | | |
|---|---|---|
| DE | 10 2014 200 647 A1 | 7/2015 |
| GB | 2507230 B | 11/2017 |
| JP | H07-31127 A | 1/1995 |
| WO | 2013/032353 A8 | 5/2013 |
| WO | 2015/107012 A1 | 7/2015 |

* cited by examiner

LINEAR ACTUATOR

FIELD

The present invention relates to a linear actuator, in particular the geometrical arrangement of permanent magnets on a ferromagnetic magnetic armature of the linear actuator, as well as the use thereof in an active engine mount of a vehicle.

BACKGROUND

In vehicles, so-called active engine mounts can be used to improve comfort. By means of an active engine mount, undesirable vibrations and a noise transmission to the interior of the vehicle caused thereby can be suppressed. Undesirable vibrations can occur for example upon a turn-off of one or several cylinders in an engine, which may cause the engine to run out of round. For this purpose, an actively mounted engine has a control for one or several actuators in order to counteract the vibrations of the engine with the help of the actuators in the fashion known to the person skilled in the art.

As actuators there can be utilized in particular linear actuators. These usually have a ferromagnetic stator which comprises an electrically energizable coil for generating an electromagnetic field as well as a ferromagnetic magnetic armature having at least one permanent magnet ring, which with regard to a longitudinal axis of the coil is axially movably mounted and opposes the stator. The magnetic field of the permanent magnet ring is superimposed by the electromagnetic field arising upon energizing the coil, thereby arising a linear movement of the magnetic armature as a result of electromagnetic forces.

The permanent magnet ring usually consists of several, mutually adjoining permanent magnet ring segments. On the permanent magnet ring segments attached to the magnetic armature there act, in dependence on the electrical energizing of the coil and as a result of the electromagnetic field generated thereby, loosening forces which necessitate an adhesive bonding of the permanent magnet ring segments to the magnetic armature.

Operation loads and temperature loads influence the strength of the adhesive bonded connection which may cause an embrittlement of the adhesive. This leads to an impairment of the adhesiveness of the adhesive bonded connection, so that it can come to a detachment of the permanent magnet ring segments from the magnetic armature in the course of time which in the end entails the function failure of the linear actuator.

SUMMARY

It is the object of the present invention to improve an adhesion of the permanent magnet ring segments to the ferromagnetic magnetic armature of the linear actuator.

According to an aspect of the invention, the linear actuator comprises a ferromagnetic magnetic armature having at least one permanent magnet ring, which opposes a ferromagnetic stator having an electrically energizable coil and which possesses several permanent magnet ring segments, wherein an angular gap exists between a surface of the permanent magnet ring segments which faces the stator and a surface of the stator which faces the permanent magnet ring segments. This leads, as a result of the axially increasing radial distance between the surface of the permanent magnet ring segments which faces the stator and the surface of the stator which faces the permanent magnet ring segments, to a reduction of tilting moments acting at the permanent magnet ring segments, because the magnetic attraction forces of the permanent magnet ring relative to the stator decrease with increasing radial distance.

This design of the magnetic armature, of the stator as well as of the geometrical arrangement of the permanent magnet ring segments at the magnetic armature allows the adhesion of the permanent magnet ring segments to the magnetic armature upon energizing the coil to be increased for all specific operating points, because the electromagnetic forces and momenta attacking the permanent magnet ring segments in a loosening fashion are reduced. This allows the usage of cost-efficient, less performant adhesives.

The angular gap preferably has a gap angle between 2° and 10°, particularly preferably between 2° and 6°. Especially good results are achieved with a gap angle of approx. 4°. Accordingly, the surface of the permanent magnet ring segments which faces the stator can have an inclination between 2° and 10° relative to the longitudinal axis of the coil, preferably between 2° and 6°, particularly preferably of 4°. It is also possible, however, that the surface of the stator which faces the permanent magnet ring segments has an inclination relative to the longitudinal axis of the coil between 2° and 10°, preferably between 2° and 6°, particularly preferably of 4°, or that the gap angle is formed by an inclination of the permanent magnet ring segment areas as well as of the stator surface.

Preferably, permanent magnet ring segments with a constant radial thickness, in particular ring segments with a cuboid cross section, are employed. Hence, the magnetic armature has a corresponding axially conical taper in the region of the permanent magnet ring segments, so that the magnetic armature supporting surface for the permanent magnet ring segments has the mentioned angle of inclination relative to the longitudinal axis of the coil of between 2° and 10°, preferably between 2° and 6°, particularly preferably of 4°.

In one embodiment, at least one further permanent magnet ring, which preferably is mirror-symmetrical to the described permanent magnet ring with regard to a plane lying perpendicular to the longitudinal axis of the coil, is attached to the magnetic armature.

Preferably, the permanent magnet ring segments of the respective permanent magnet ring are arranged at the magnetic armature with a relatively great tangential distance to each other. Between the permanent magnet ring segments there exists thus an angle distance of 2° to 5°, preferably of 3.5°. The distance is preferably so great that the repulsion forces acting tangentially between the permanent magnet ring segments or the lift-off forces resulting therefrom and acting radially on the permanent magnet ring segments are lower than the magnetic attraction forces acting radially between the permanent magnet ring segments and the magnetic armature. This eliminates the need of mechanical fixation of the permanent magnet ring segments to the magnetic armature during assembling the permanent magnet ring on the magnetic armature. Consequently, according to a preferred embodiment, an adhesive bonded connection between the permanent magnet ring segments and the magnetic armature can be completely omitted. An elaborate pretreatment of the adhesively bonded areas as well as a posttreatment of the adhesive until curing, in the form of tempering, can thus also be omitted, which enables quicker cycle times upon assembling the linear actuator.

An adhesive layer prevailing between the permanent magnet ring segments and the ferromagnetic magnetic armature additionally acts, as a result of the lower magnetic conductivity of the adhesive layer compared to the magnetic armature, magnetically isolating and thereby hinders the magnetic flux. Omitting the adhesive bonded connection thus has a positive influence on the magnetic flux and therefore on the adhesion of the permanent magnet ring segments to the magnetic armature.

For further increasing the adhesion of the permanent magnet ring segments to the magnetic armature, it is advantageous that the magnetic armature consists of a material with a higher permeability in comparison to the stator. The higher permeability of the magnetic armature in comparison to the stator effects a corresponding increase of the magnetic flux in the magnetic armature. This increases in particular the radially acting attraction forces between the permanent magnet ring segments and the magnetic armature in comparison to the radially acting forces between the permanent magnet ring segments and the stator which have a detaching effect on the permanent magnet ring segments from the magnetic armature.

In principle, an arrangement of the permanent magnet ring segments at the magnetic armature, in which the magnetization direction of the permanent magnet ring segments extends in parallel or perpendicular to the supporting surface at the magnetic armature is possible. Since the magnetic forces of a permanent magnet act especially strongly at the north pole and south pole thereof, an arrangement is advantageous in which the magnetization direction of the permanent magnet ring segments extends perpendicular to the supporting surface at the magnetic armature, so that the adhesion of the permanent magnet ring segments to the magnetic armature is influenced positively.

The inclined arrangement of the permanent magnet ring segments leads to a weakening of the magnetic circle. The enlarged tangential distances between the permanent magnet ring segments of the corresponding permanent magnet ring, furthermore, decrease the permanent magnet volume. In both cases this leads to an impairment of performance of the linear actuator. Hence, preferably permanent magnet ring segments with a greater radial thickness and/or permanent magnet ring segments from an accordingly more powerful material are used.

BRIEF DESCRIPTION OF THE FIGURES

Preferred embodiments of the invention as well as further advantageous configurations are explained in more detail with reference to the accompanying drawings. There are shown.

DETAILED DESCRIPTION OF THE FIGURES

Figure 1:
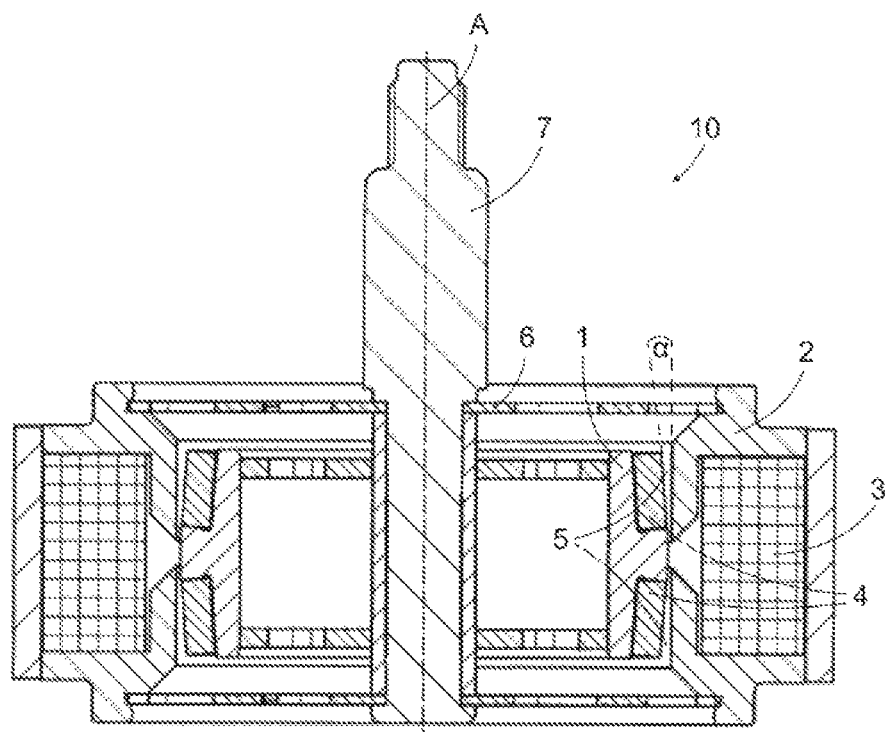
FIG. 1 a linear actuator with magnetic armature in a sectional representation and FIG. 2 a perspective representation of the magnetic armature of the linear actuator of FIG. 1.

In FIG. 1 there is represented a linear actuator 10 for an active engine mount of a motor vehicle, whose structure and mode of function is described in detail in the print DE 10 2013 202 166 A1. Reference is explicitly made in this respect to the content of this print.

The linear actuator 10 has a stationary stator 2 from ferromagnetic material, which comprises an electrically energizable coil 3 as well as a magnetic armature 1 likewise from ferromagnetic material which with regard to a longitudinal axis A of the coil 3 is axially movably mounted at the stator 2 through spring washers 6. Moreover, the linear actuator 10 comprises a plunger 7 attached to the magnetic armature, by whose displacement the linear actuator 10 can influence other components of the active engine mount such that vibrations of the engine of the motor vehicle are counteracted. Here, the magnetic armature 1 is located in the radially interior region, and the stator 2 with the coil 3 in the radially exterior region of the linear actuator 10, with a reverse arrangement of these components, in principle, also being possible. The magnetic armature 1 comprises two permanent magnet rings 4 which are attached mirror-symmetrically to the magnetic armature 1 with regard to a plane perpendicular to the longitudinal axis A of the coil 3 and oppose the stator 2. There can also be provided more than two, in particular four, six, or eight permanent magnet rings 4 in a corresponding mirror-symmetrical arrangement with regard to the plane.

In an energized state of the coil 3, by the current flow a magnetic field is generated which spreads perpendicular to the turns of the coil 3, in the ferromagnetic stator 2, the permanent magnet rings 4 and the ferromagnetic magnetic armature 1. The direction of the magnetic field lines of the magnetic field generated by the coil 3 depends here on the direction of the current flow through the coil 3. The permanent magnet rings 4 attached to the magnetic armature 1 respectively have their own magnetic field. The flux lines of these magnetic fields extend oppositely oriented to each other and superimpose upon energizing the coil 3 with the magnetic field caused thereby. By a superimposition of the magnetic fields there arises a force which causes an axial movement of the magnetic armature 1 and thus of the plunger 7. The mentioned movement thus depends on the strength and the direction of the current in the coil 3. The concrete course of the magnetic field is determined substantially by the geometrical shape of the metallic components, in particular magnetic armature 1 and stator 2. In the print DE 10 2014 200 647 A1 it is explained how such magnetic field courses may arise.

Figure 2:
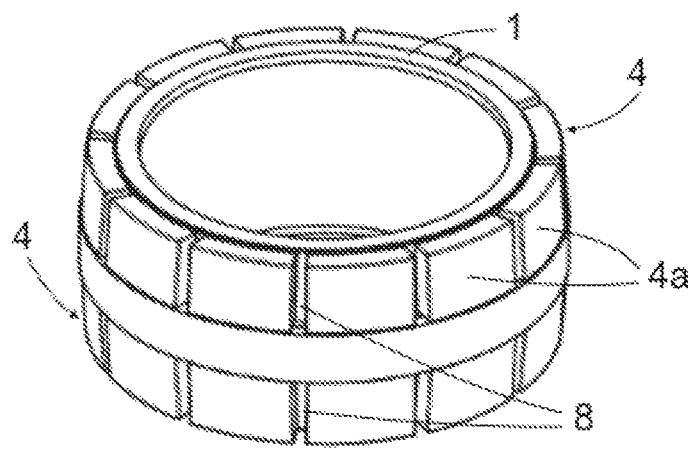

As shown in FIG. 2, the two permanent magnet rings 4 are respectively formed of several permanent magnet ring segments 4a. Here, the two permanent magnet rings 4 consist of twelve permanent magnet ring segments 4a which each have a tangential distance 8 to each other. Here, one has to bear in mind that the permanent magnet ring segments 4a of the respective permanent magnet ring 4 are arranged at the magnetic armature 1 with a such great tangential distance 8 to each other that the repulsion forces acting tangentially between the permanent magnet ring segments 4a and the lift-off forces resulting therefrom and acting radially on the permanent magnet ring segments 4a are lower than the magnetic attraction forces acting radially between the permanent magnet ring segments 4a and the magnetic armature 1.

Between a surface of the permanent magnet ring segments 4a which faces the stator 2 and a surface of the stator 2 which faces the permanent magnet ring segments 4a there exists an angular gap 5 (FIG. 1) whose gap angle α is between 2° and 10°, preferably between 2° and 6°, and particularly preferably is 4° and is filled with air or, where applicable, with oil. In order to obtain the corresponding gap angle α, the surface of the permanent magnet ring segments 4a which faces the stator 2 has the respective inclination relative to the longitudinal axis A of the coil 3, as represented in FIG. 1. Further configurations of the angular gap 5 are possible, e.g., by inclining the surface of the stator 2 which faces the permanent magnet ring segments 4a, then the surface of the permanent magnet ring segments 4a which faces the stator 2 remains directed in parallel to the longitudinal axis A of the coil 3, or by inclining the two mentioned surfaces so that the angular gap 5 with the corresponding gap angle α arises.

From FIG. 1 it is evident that the magnetic armature 1 has an axially conical taper in the region of the permanent magnet ring segments 4a, so that permanent magnet ring segments 4a with constant radial thickness, in particular ring segments with cuboid cross section, can be employed. Here, the permanent magnet ring segments 4a have an axial length of 8 mm and a radial thickness of 3 mm, i.e. a ratio between axial length to radial thickness of 2.67:1. Ratios of 2.5:1 to 3.0:1 can be expedient values. The tangential distance 8 between the permanent magnet ring segments 4a amounts here to approx. 1.4 mm, this corresponds, with an inside diameter of the permanent magnet ring 4 of 45.4 mm, to a value of 3.5°. Angle distances between 3° and 5° can be expedient values.

The magnetization direction of the permanent magnet ring segments 4a extends preferably perpendicular to the supporting surface of the permanent magnet ring segments 4a at the magnetic armature 1, because the magnetic forces of a permanent magnet act especially strongly on the north pole and south pole thereof, so that the adhesion of the permanent magnet ring segments 4a to the magnetic armature 1 is enhanced. In principle, arrangements of the permanent magnet ring segments 4a at the magnetic armature 1 deviating therefrom, in particular an arrangement with a magnetization direction parallel to the supporting surface at the magnetic armature are also possible.

A further increase of the adhesion of the permanent magnet ring segments 4a to the magnetic armature 1 can be achieved by the magnetic armature 1 having a higher magnetic flux in comparison to the stator 2. This can be achieved, inter alia, by the magnetic armature 1 consisting of a material with a higher permeability than the stator 2.

By the increased adhesion of the permanent magnet ring segments 4a to the magnetic armature 1, as a result of higher magnetic attraction forces acting radially between the permanent magnet ring segments 4a and the magnetic armature 1, an adhesive layer between the permanent magnet ring segments 4a and the magnetic armature 1 can be omitted. An adhesive layer as a result of its lower magnetic conductivity compared with the magnetic armature acts magnetically isolating and thereby hinders the magnetic flux. Omitting the adhesive layer thus has a positive influence on the magnetic flux.

The invention claimed is:

1. A linear actuator, comprising:
a stator which has an electrically energizable coil for generating an electromagnetic field, as well as a magnetic armature which is mounted axially movable with regard to a longitudinal axis of the coil and has at least one permanent magnet ring which opposes the stator and has several permanent magnet ring segments, wherein between a surface of the permanent magnet ring segments which faces the stator and a surface of the stator which faces the permanent magnet ring segments there exists an angular gap such that a radial distance between the surface of the permanent magnet ring segments which faces the stator and the surface of the stator which faces the permanent ring segments increases in the direction of the longitudinal axis.

2. The linear actuator according to claim 1, wherein the angular gap has a gap angle between 2° and 10°.

3. The linear actuator according to claim 1, wherein the surface of the permanent magnet ring segments which faces the stator has an inclination relative to the longitudinal axis of the coil between 2° and 10°.

4. The linear actuator according to claim 1, wherein the surface of the stator which faces the permanent magnet ring segments has an inclination relative to the longitudinal axis of the coil between 2° and 10°.

5. The linear actuator according to claim 1, wherein the magnetic armature axially conically tapers in the region of the permanent magnet ring segments.

6. The linear actuator according to claim 1, wherein in addition to the at least one permanent magnet ring there is attached at least one further permanent magnet ring to the magnetic armature in a mirror-symmetrical fashion with regard to a plane lying perpendicular to the longitudinal axis of the coil.

7. The linear actuator according to claim 1, wherein the permanent magnet ring segments of the permanent magnet ring are arranged at the magnetic armature with a tangential distance to each other.

8. The linear actuator according to claim 7, wherein there exists an angle distance between the permanent magnet ring segments of 2° to 5°.

9. The linear actuator according to claim 7, wherein the permanent magnet ring segments are arranged to each other with such a tangential distance that lift-off forces acting radially on the permanent magnet ring segments and resulting from repulsion forces acting tangentially between the permanent magnet ring segments are lower than magnetic attraction forces acting radially between the permanent magnet ring segments and the magnetic armature.

10. The linear actuator according to claim 1, wherein the permanent magnet ring segments are held at the magnetic armature only by their magnetic forces.

11. The linear actuator according to claim 1, wherein the magnetic armature consists of a material with higher permeability in comparison to the stator.

12. The linear actuator according to claim 1, wherein the magnetization direction of the permanent magnet ring segments extends perpendicular to a supporting surface of the magnetic armature on which the permanent magnet ring segments rest.

13. The linear actuator according to claim 1, wherein the permanent magnet segments have a ratio of axial length to radial thickness from 2.5:1 to 3.0:1.

14. A use of the linear actuator according to claim 1 in an engine mount for an engine of a vehicle.

* * * * *